(12) United States Patent
Lee et al.

(10) Patent No.: US 8,053,006 B2
(45) Date of Patent: *Nov. 8, 2011

(54) METHOD OF MAKING BREAD AND BREAD MADE BY THE METHOD

(75) Inventors: Myoung Gu Lee, Seoul (KR); Jong Min Lee, Seongnam-si (KR); Gil Hong Cha, Seongnam-si (KR)

(73) Assignee: Paris Croissant Co., Ltd., Songnam-Shi, Kyoungki-Do (KR)

( * ) Notice: Subject to any disclaimer, the term of this patent is extended or adjusted under 35 U.S.C. 154(b) by 215 days.

This patent is subject to a terminal disclaimer.

(21) Appl. No.: 12/418,548

(22) Filed: Apr. 3, 2009

(65) Prior Publication Data

US 2010/0255151 A1 Oct. 7, 2010

(51) Int. Cl.
*A21D 2/00* (2006.01)
*A21D 8/02* (2006.01)
(52) U.S. Cl. .............. 426/19; 426/60; 426/62; 426/656
(58) Field of Classification Search ............... 426/19, 426/60, 62, 656, 458
See application file for complete search history.

(56) References Cited

U.S. PATENT DOCUMENTS 3,375,117 A * 3/1968 Schremmer ............... 426/62
4,904,485 A * 2/1990 Hirakawa et al. ........... 426/62
5,789,011 A * 8/1998 Kobori et al. .............. 426/611

FOREIGN PATENT DOCUMENTS

JP 2005110698 * 4/2005

OTHER PUBLICATIONS

JP2005110698. English Translation. Accessed online from JPO.*
American Society of Heating, Refrigerating and Air-Conditioning Engineers, Inc. 2006 ASHRAE Handbook—Refrigeration (I-P Edition). Chapter 28, Bakery Products. Online version available at: http://knovel.com/web/portal/browse/display?_EXT_KNOVEL_DISPLAY bookid=2395&VerticalID=0.*

* cited by examiner

*Primary Examiner* — Humera Sheikh
*Assistant Examiner* — Saeeda Latham
(74) *Attorney, Agent, or Firm* — patenttm.us

(57) ABSTRACT

A bread making method including: a cold sponge process where strong flour, dried yeast, yeast food, salt, an improver, and water are mixed, stirred at low speed, stirred at high speed, and then fermented at a temperature and relative humidity; a dough process in which the resulting mixture of the cold sponge process is mixed with strong flour, sugar, salt, dried milk, dried yeast, margarine, and water, and the to resulting mixture is given a floor time and then divided into pieces; a freezing storage process in which the dough is frozen, wrapped in plastic, and stored at a temperature of less than −18 degrees C.; a thawing process in which the resulting dough pieces of the freezing process are thawed; and a second fermentation process in which each of the resulting dough pieces is molded and subjected to a second fermentation.

9 Claims, 2 Drawing Sheets

METHOD OF MAKING BREAD AND BREAD MADE BY THE METHOD

BACKGROUND OF THE INVENTION

1. Field of the Invention

The present invention relates to a method of making bread and bread made by the method, and more particularly, to a method of making bread that can increase taste appeal and slow aging by fermenting dough at a low temperature for a long time to improve its texture and flavor, and bread made by the method.

2. Description of Related Art

Typically, bread is made by mixing wheat flour, yeast, salt, water, etc., as main ingredients, and sugar, dairy products, eggs, oil, etc., as secondary ingredients, to form a dough, and fermenting and baking the dough. Nowadays, people's busy lifestyles, changes in dietary habits, and westernization of culture have led to large consumption of bread, plain or in the form of toast, sandwiches, etc. To meet the trend, bread products are made by and distributed from bakeries under franchise.

That is, in order to supply fresher products at low prices, the franchised bakeries supply the bread products by purchasing semi-finished frozen dough products from a manufacturing plant, thawing and fermenting the dough using a dough conditioner, and baking the resulting dough in an oven for baking bread.

Meanwhile, bread-making methods include a straight dough process, a sponge dough method, a continuous dough mixing process, a liquid fermentation process, etc. In the sponge dough method, also called a sponge method, a portion (more than 50%) of wheat flour is mixed with yeast and water to form a sponge. After a first fermentation for at least two hours, the sponge is mixed with the remaining portion of wheat flour, secondary ingredients (such as sugar or salt), and water, and the resulting mixture is given a floor time, subjected to a molding process, etc., and then subjected to a second fermentation. It is known in the art that the sponge dough method increases the stability of fermentation, promotes expansion of the dough due to ripening, and improves the flavor of the bread.

However, the first fermentation process, which has a significant effect on the quality of bread in the sponge dough method, is performed at a low or high temperature for a relatively short time, and thus the texture and volume of bread deteriorate.

Moreover, the dough produces various aromatic substances by alcohol fermentation, lactic acid fermentation, and fermentation with other organic acids after proper ripening, and thus the flavor of bread is improved. At the same time, the dough has physical properties such as proper viscosity and elasticity. However, the first fermentation process according to the conventional method has the following problems. In the event of a power failure or some other accident in a fermentation room, the fermentation time and temperature, which are the most important factors determining the quality of bread, can easily exceed standards, causing the dough to be under-ripened or over-ripened. Since such dough cannot ensure uniform taste, the whole quantity of dough should be disposed of, which is very costly and significantly reduces production efficiency. Thus, the first fermentation process is not suitable for mass production.

Further, the conventional method of making bread is not suitable for the sale of the franchise system, which should provide differentiated, competitive quality. Therefore, it is necessary to develop a bread-making method that can improve the quality of bread.

After several years of research aimed at developing a bread-making method, which can improve the texture and flavor of bread and slow the aging process, and especially, which is suitable for the sale of the franchise system, the present inventor arrived at the present invention.

SUMMARY OF THE INVENTION

The present invention is directed to a method of making bread that can increase taste appeal and productivity, and bread made by the method.

The present invention is also directed to a method of making bread that can slow the aging process, and bread made by the method.

In one aspect, the present invention provides a method of making bread including a cold sponge process, a dough process, a freezing storage process, a thawing process, and a second fermentation process. In the cold sponge process, 18 to 19.5 parts by weight strong flour, 0.18 to 0.21 parts by weight dried yeast, 0.03 to 0.036 parts by weight yeast food, 0.06 to 0.09 parts by weight salt, 0.06 to 0.09 parts by weight an improver, and 10.2 to 11.4 parts by weight water are mixed at a temperature of 15 to 17° C., stirred at low speed for 2 to 4 minutes, stirred at high speed for 1 to 2 minutes, and then fermented at a temperature of 2 to 4° C. and a relative humidity of 90 to 95% for 15 to 18 hours. In the dough process, the resulting mixture of the cold sponge process is mixed with 12 to 13.5 parts by weight strong flour, 2.1 to 2.7 parts by weight sugar, 0.45 to 0.54 parts by weight salt, 0.9 to 1.5 parts by weight dried milk, 0.09 to 0.15 parts by weight dried yeast, 2.1 to 3 parts by weight margarine, and 8.1 to 9.3 parts by weight water, and the resulting mixture is given a floor time of 15 to 20 minutes and then divided into dough pieces. In the freezing storage process, the resulting dough pieces of the dough process are frozen at −38° C. for 40 minutes, wrapped in plastic, and stored at a temperature of less than −18° C. In the thawing process, the resulting dough pieces of the freezing storage process are thawed at 5° C. for 12 to 16 hours. In the second fermentation process, each of the resulting dough pieces is molded and subjected to a second fermentation at a temperature of 35° C. and a relative humidity of 80 to 85% for 50 to 60 minutes.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE INVENTION

Hereinafter, exemplary embodiments of the present invention will be described in detail with reference to the accompanying drawings.

Terms used herein are defined based on functions in the present invention and will be construed to cover concepts corresponding to the sprit of the present invention and inherent meanings generally used in the art.

Further, when it is deemed that describing certain well-known functions or components would detract from the clarity and concision of the description of the invention, the well-known functions or components will not be described.

Figure 1:
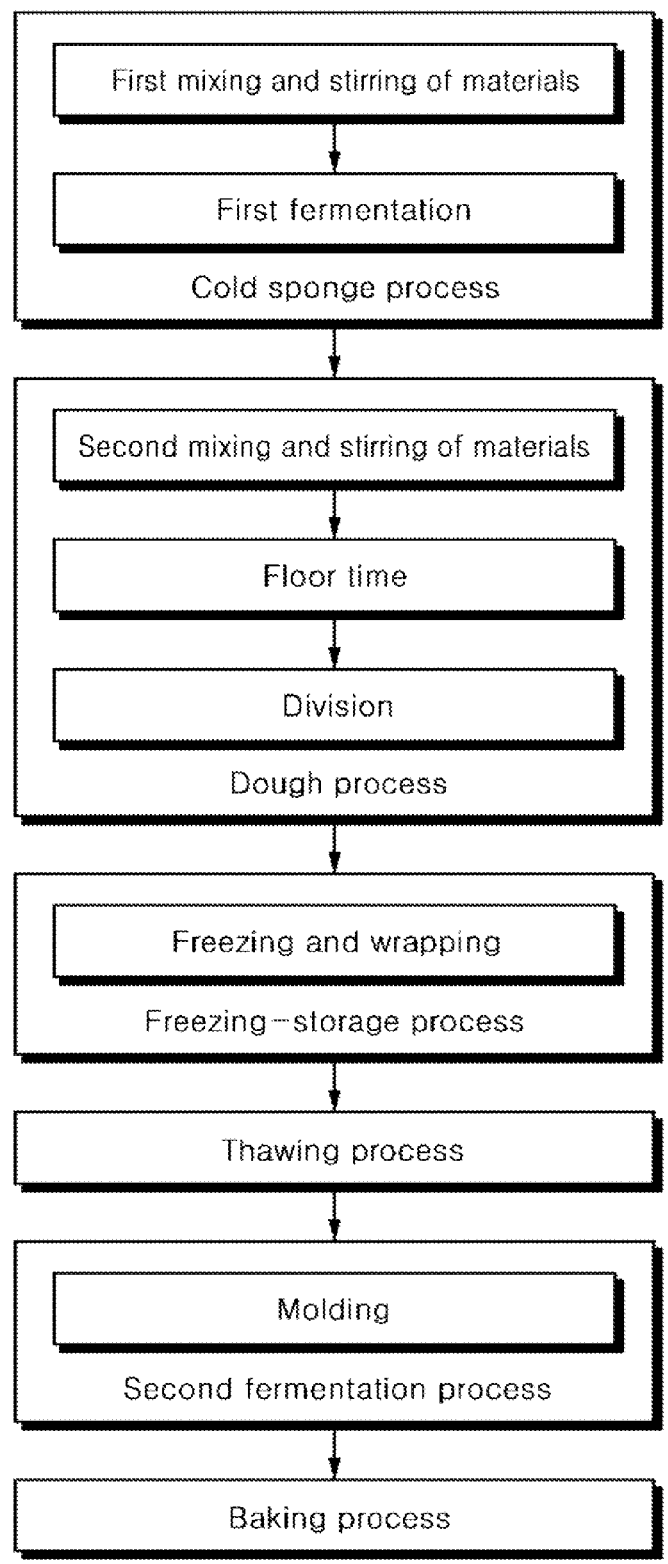
FIG. 1 is a flowchart illustrating a method of making bread in accordance with an embodiment of the present invention.

As shown in FIG. 1, a method of making bread in accordance with an embodiment of the present invention includes a cold sponge process, a dough process, a freezing storage process, a thawing process, and a second fermentation process.

In the cold sponge process, a portion of strong flour is mixed with other ingredients such as yeast and water to form a sponge, and the sponge is fermented.

In detail, 18 to 19.5 parts by weight strong flour for bread making, 0.18 to 0.21 parts by weight dried yeast, 0.03 to 0.036 parts by weight yeast food, 0.06 to 0.09 parts by weight salt, 0.06 to 0.09 parts by weight an improver, and 10.2 to 11.4 parts by weight water are mixed at a temperature of 15 to 17° C. The resulting mixture is stirred at a temperature at which the activity of the yeast is reduced and at low speed for 2 to 4 minutes and then stirred at high speed for 1 to 2 minutes.

At this time, in the mixing and fermentation process, connection and ripening of gluten occurs so that a soft and smooth gluten layer is obtained.

Next, the resulting mixture is fermented at a temperature of 2 to 4° C. and a relative humidity of 90 to 95% for 15 to 18 hours in accordance with the embodiment of the present invention.

Preferably, the fermentation temperature of the cold sponge process is set to 3° C. and the fermentation time is set to 16 hours so as to give the bread a softer and chewier texture.

The above-described cold sponge process allows the sponge to be fermented slowly and ripened enough by its temperature distribution, thus offering appetizing flavor. Moreover, the yeast produces a three-dimensional network structure by the gluten slowly and naturally to improve the flavor of the bread and significantly slow the aging process.

In the dough process, the resulting mixture of the cold sponge process is mixed with other ingredients to form a dough.

In detail, the resulting mixture of the cold sponge process is mixed with 12 to 13.5 parts by weight strong flour, 2.1 to 2.7 parts by weight sugar, 0.45 to 0.54 parts by weight salt, 0.9 to 1.5 parts by weight dried milk, 0.09 to 0.15 parts by weight dried yeast, 2.1 to 3 parts by weight margarine, and 8.1 to 9.3 parts by weight water.

Next, the mixed dough is given a floor time of 15 to 20 minutes such that the softness and stability of the mixed dough are increased, and is then subjected to a division process.

In the freezing storage process, the resulting dough of the dough process is frozen in a freezer at −38° C. for 40 minutes, wrapped in plastic, and stored at a temperature of less than −18° C.

The resulting dough of the dough process can be stored in the frozen state up to nine months by the freezing storage process.

In the thawing process, the resulting dough of the freezing storage process is thawed at 5° C. for 12 to 16 hours.

Here, the thawed dough may be further thawed at room temperature for about 1 hour so as to promote the activity of the yeast.

The second fermentation process is performed to promote the ripening and expansion of the gluten so as to obtain bread of desirable shape and texture.

In the second fermentation process, the dough recovered during the thawing process is fed into a molder to deflate the dough to the extent that the dough is not cut by a roller. Then, the resulting dough is rolled out, molded, and then subjected to a second fermentation at a temperature of 36 to 40° C. to increase the activity of the yeast, and a relative humidity of 90 to 95% to provide desired elasticity to the dough, for 50 to 60 minutes.

The embodiment of the present invention including the above-described processes makes bread of better quality than the conventional sponge method.

Embodiment 1

18 parts by weight strong flour, 0.19 parts by weight dried yeast, 0.03 parts by weight yeast food, 0.07 parts by weight salt, 0.06 parts by weight an improver, and 10.6 parts by weight water were mixed. During mixing, the temperature was maintained at 15 to 17° C. Subsequently, the mixture was stirred at low speed for 4 minutes, stirred at high speed for 2 minutes, and then fermented at a temperature of 3° C. for 16 hours. At this time, the relative humidity was maintained at 90 to 95%.

Next, the resulting mixture was mixed with 13 parts by weight strong flour, 2.3 parts by weight sugar, 0.48 parts by weight salt, 0.13 parts by weight dried milk, 0.12 parts by weight dried yeast, 2.9 parts by weight margarine, and 9.1 parts by weight water, and the resulting mixture was given a floor time of 15 minutes and then divided into equal-sized pieces.

Then, the divided dough pieces were frozen in a freezer at −38° C. for 40 minutes, wrapped in polyethylene film, and stored at a temperature of less than −18° C.

The stored dough pieces were thawed at 5° C. for 12 to 16 hours after a predetermined time corresponding to a transport time from a mass production plant to a bakery.

Next, each of the thawed dough pieces was molded and subjected to a second fermentation at a temperature of 38° C. for 50 to 60 minutes. At this time, the relative humidity was maintained at 90 to 95%.

The dough pieces after the fermentation were placed in an oven and baked at 200° C. for 30 minutes.

Embodiment 2

19.2 parts by weight strong flour, 0.2 parts by weight dried yeast, 0.033 parts by weight yeast food, 0.07 parts by weight salt, 0.07 parts by weight an improver, and 11.2 parts by weight water were mixed. During mixing, the temperature was maintained at 15 to 17° C. Subsequently, the mixture was stirred at low speed for 4 minutes, stirred at high speed for 2 minutes, and then fermented at a temperature of 2° C. for 17 hours. During fermentation, the relative humidity was maintained at 90 to 95%.

Next, the resulting mixture was mixed with 13 parts by weight strong flour, 2.1 parts by weight sugar, 0.46 parts by weight salt, 1.2 parts by weight dried milk, 0.1 parts by weight dried yeast, 2.3 parts by weight margarine, and 8.9 parts by weight water, and the resulting mixture was given a floor time of 15 minutes and then divided into equal-sized pieces.

Then, the divided dough pieces were frozen in a freezer at −38° C. for 40 minutes, wrapped in polyethylene film, and stored at a temperature of less than −18° C.

The stored dough pieces were thawed at 5° C. for 12 to 16 hours after a predetermined time corresponding to a transport time from a mass production plant to a bakery.

Next, each of the thawed dough pieces was molded and subjected to a second fermentation at a temperature of 38° C. for 50 to 60 minutes. During fermentation, the relative humidity was maintained at 90 to 95%.

The dough pieces after the fermentation were placed in an oven and baked at 200° C. for 30 minutes.

Comparative Example 19.2 parts by weight strong flour, 0.2 parts by weight dried yeast, 0.033 parts by weight yeast food, 0.07 parts by weight salt, 0.07 parts by weight an improver, and 11.2 parts by weight water were mixed. During mixing, the temperature was maintained at 15 to 17° C. Subsequently, the mixture was stirred at low speed for 4 minutes, stirred at high speed for 2 minutes, and then fermented at a temperature of 18° C. for 16 hours. During fermentation, the relative humidity was maintained at 90 to 95%.

Next, the resulting mixture was mixed with 13 parts by weight strong flour, 2.1 parts by weight sugar, 0.46 parts by weight salt, 1.2 parts by weight dried milk, 0.1 parts by weight dried yeast, 2.3 parts by weight margarine, and 8.9 parts by weight water, and the resulting mixture was given a floor time of 15 minutes and then divided into equal-sized pieces.

Then, the divided dough pieces were frozen in a freezer at −38° C. for 40 minutes, wrapped in polyethylene film, and stored at a temperature of less than −18° C.

The stored dough pieces were thawed at 5° C. for 12 to 16 hours after a predetermined time corresponding to a transport time from a mass production plant to a bakery.

Next, each of the thawed dough pieces was molded and subjected to a second fermentation at a temperature of 38° C. for 50 to 60 minutes. During fermentation, the relative humidity was maintained at 90 to 95%.

The dough pieces after the fermentation were placed in an oven and baked at 200° C. for 30 minutes.

[Sensory Evaluation]

Figure 2:
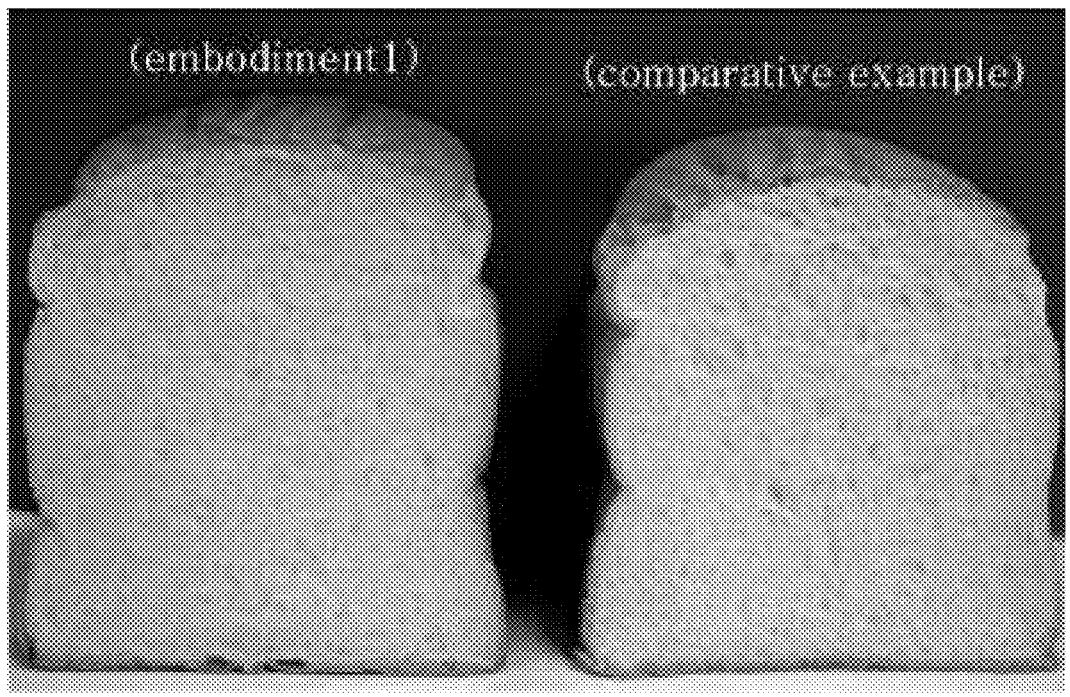
FIG. 2 is a photograph of a slice of bread made in accordance with Embodiment 1 of the present invention and a slice of bread made in accordance with a Comparative Example.

As shown in the photograph of FIG. 2, the bread made according to Embodiment 1 of the present invention has smooth and soft pores compared to the bread made according to the Comparative Example. Moreover, since the inside of the bread of Embodiment 1 is dense and uniform, its volume and texture are excellent, which has a good effect on the shape of the bread, and thus there is a significant difference in visual appeal.

Meanwhile, a sensory evaluation was carried out on the breads made according to Embodiments 1 and 2 of the present invention and the bread according to the Comparative Example of the conventional method. The breads were left at room temperature for one day and cut to a predetermined size. Thirty housewives, selected based on their reliability and interest in the evaluation, participated in the sensory evaluation after the objects of the test and the evaluation method were explained to them.

To perform tasting, each of the participants ate a piece of bread, evaluated the corresponding sample, rinsed her mouth with bottled water, and then tasted another sample.

To perform the evaluation, each of the participants evaluated six sensory properties—overall taste appeal, flavor, taste, softness, chewiness, and moistness—of the samples of Embodiments 1 and 2 and the Comparative Example according to a 5-point scale (5—very good, 4—good, 3—average, 2—bad, and 1—very bad).

The resulting average scores for each item are shown in the following Table 1:

TABLE 1

| Item | Average score | | |
|---|---|---|---|
| | Comparative Example | Embodiment 1 | Embodiment 2 |
| Flavor | 3.7 | 4.1 | 4.2 |
| Taste | 3.3 | 4.1 | 4.0 |
| Softness | 3.6 | 4.2 | 4.1 |
| Chewiness | 4.1 | 4.2 | 4.1 |
| Moistness | 3.9 | 4.0 | 3.9 |
| Overall taste appeal | 3.8 | 4.3 | 4.2 |

It can be seen from the above results of the sensory evaluation that Embodiments 1 and 2 of the present invention showed significant differences from the Comparative Example with respect to each of flavor, taste, softness, chewiness, moistness, and overall taste appeal.

That is, it can be seen that the quality and taste appeal of the breads according to Embodiments 1 and 2 were higher than those of the bread according to the Comparative Example.

[Aging Test]

To examine the effect of the method of making bread in accordance with the present invention on the shelf life of the samples, the samples according to Embodiments 1 and 2 and the Comparative Example were cut to a thickness of 10 mm, 50 pieces for each sample were wrapped in polyethylene film and placed in an incubator at 30° C. to perform a decay test.

The internal temperature during wrapping was 30° C., and the decay time was determined as the time when the sample began to mold or give off an offensive odor. The average shelf-lives are shown in the following Table 2, and the average decay rates are shown in the following Table 3:

TABLE 2

| days | Elapsed Days | | | | | | | | | Average shelf life |
|---|---|---|---|---|---|---|---|---|---|---|
| Sample group | 0 | 1 | 2 | 3 | 4 | 4.5 | 5 | 5.5 | 6 | (Days) |
| Comparative Example | − | − | − | − | − | + | + | + | + | 4.5 |
| Embodiment 1 | − | − | − | − | − | − | − | + | + | 5.5 |
| Embodiment 2 | − | − | − | − | − | − | − | + | + | 5.5 |

TABLE 3

| rate (%) | Average decay Days | | | | |
|---|---|---|---|---|---|
| Sample group | 4 | 4.5 | 5 | 5.5 | 6 |
| Comparative Example | 0 | 55 | 100 | — | — |
| Embodiment 1 | 0 | 0 | 20 | 70 | 100 |
| Embodiment 2 | 0 | 0 | 30 | 85 | 100 |

As can be seen from the above results, the samples in the Comparative Example started to decay after an average of 4.5 days, and all completely decayed by the fifth day. However, the samples in Embodiments 1 and 2 did not change until the fifth day, started to decay after an average of 5.5 days, and all completely decayed by the sixth day.

The samples in the Comparative Example showed an average decay rate of 60 to 100% from 4.5 days to 5 days, whereas, the samples in Embodiments 1 and 2 showed an average decay rate of 20 to 85% from 5 days to 5.5 days and showed an average decay rate of 70 to 100% from 5.5 days to 6 days.

Moreover, the external appearances of the samples according to Embodiments 1 and 2 of the present invention were quite good and the flavor also remained.

Thus, the average shelf life of Embodiments 1 and 2 were increased by about one day, compared to that of the Comparative Example, and the aging process was also slowed, from which it can be seen that the time required for the bread to completely decay increased.

As described above, the bread made by the method in accordance with the embodiment of the present invention has excellent texture and flavor, thus enhancing its taste appeal. Moreover, anti-aging effect is increased to significantly improve shelf life and thus extend the commercial expiration date.

Moreover, since the first fermentation process according to the present invention is performed at a low temperature, it is possible to prevent the quality of dough from deteriorating for a predetermined period of time even if a power failure or some other accident occurs in a fermentation room. Thus, it is possible to prevent the dough from being under-ripened or over-ripened due to a temporary change in temperature in the fermentation room during the first fermentation process, thus preventing loss of materials and increasing productivity.

Furthermore, since the dough prepared according to the present invention is frozen after the first fermentation is performed at a cold temperature and then supplied to a bakery, the second fermentation proceeds smoothly during thawing, and thus the flavor of bread is improved. Accordingly, it is possible to differentiate the bread products in a so-called franchise system, thus enhancing quality competitiveness and market competitiveness.

While exemplary embodiments of the present invention have been described and illustrated, it should be understood that various modifications to the described embodiments, which may be evident to those skilled in the art, can be made without departing from the spirit and scope of the present invention as defined by the appended claims.

What is claimed is:

1. A method of making bread, comprising:
   a cold sponge process in which 18 to 19.5 parts by weight strong flour, 0.18 to 0.21 parts by weight dried yeast, 0.03 to 0.036 parts by weight yeast food, 0.06 to 0.09 parts by weight salt, 0.06 to 0.09 parts by weight an improver, and 10.2 to 11.4 parts by weight water are mixed at a temperature of 15 to 17° C., stirred at low speed for 2 to 4 minutes, stirred at high speed for 1 to 2 minutes, and then fermented at a temperature of 2 to 4° C. and a relative humidity of 90 to 95% for 15 to 18 hours;
   a dough process in which the resulting mixture of the cold sponge process is mixed with 12 to 13.5 parts by weight strong flour, 2.1 to 2.7 parts by weight sugar, 0.45 to 0.54 parts by weight salt, 0.9 to 1.5 parts by weight dried milk, 0.09 to 0.15 parts by weight dried yeast, 2.1 to 3 parts by weight margarine, and 8.1 to 9.3 parts by weight water, and the resulting mixture is given a floor time of 15 to 20 minutes and then divided into dough pieces;
   a freezing process in which the resulting storage dough pieces of the dough process are frozen at −38° C. for 40 minutes, wrapped in plastic, and stored at a temperature of less than −18° C.;
   a thawing process in which the resulting dough pieces of the freezing storage process are thawed at 5° C. for 12 to 16 hours; and
   a second fermentation process in which each of the resulting dough pieces is molded and subjected to a second fermentation at a temperature of 35° C. and a relative humidity of 80 to 85% for 50 to 60 minutes.

2. The method of claim 1, wherein the fermentation temperature of the cold sponge process is 3° C.

3. The method of claim 1 wherein the fermentation time of the cold sponge process is 16 hours.

4. A bread made by the method of claim 1.

5. The method of claim 2 wherein the fermentation time of the cold sponge process is 16 hours.

6. A bread made by the method of claim 2.

7. A bread made by the method of claim 3.

8. A bread made by the method of claim 4.

9. A bread made by the method of claim 5.

* * * * *